United States Patent
Nishiguchi et al.

(10) Patent No.: US 12,371,051 B2
(45) Date of Patent: Jul. 29, 2025

(54) VEHICLE, CONTROL DEVICE AND CONTROL METHOD THEREFOR, AND STORAGE MEDIUM

(71) Applicant: HONDA MOTOR CO., LTD., Tokyo (JP)

(72) Inventors: Haruhiko Nishiguchi, Tokyo (JP); Daichi Kato, Tokyo (JP); Shingo Ito, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 50 days.

(21) Appl. No.: 18/582,044

(22) Filed: Feb. 20, 2024

(65) Prior Publication Data

US 2024/0326854 A1 Oct. 3, 2024

(30) Foreign Application Priority Data

Mar. 28, 2023 (JP) .................. 2023-051953

(51) Int. Cl.
*B60W 50/14* (2020.01)
*B60K 35/28* (2024.01)

(52) U.S. Cl.
CPC ............. *B60W 50/14* (2013.01); *B60K 35/28* (2024.01); *B60K 2360/119* (2024.01);
(Continued)

(58) Field of Classification Search
CPC ........... B60W 50/14; B60W 2050/146; B60W 2556/40; B60W 2556/45;
(Continued)

(56) References Cited

U.S. PATENT DOCUMENTS 9,304,513 B2  4/2016  Ichikawa et al.
9,891,622 B2  2/2018  Ichikawa et al.
(Continued)

FOREIGN PATENT DOCUMENTS

JP  5382218 B2  1/2014
JP  2018-103767 A  7/2018
(Continued)

OTHER PUBLICATIONS

Japanese Office Action for Japanese Patent Application No. 2023051953 mailed Aug. 30, 2024 (partially translated).

*Primary Examiner* — Omeed Alizada
(74) *Attorney, Agent, or Firm* — Thomas Horstemeyer, LLP

(57) ABSTRACT

A control device for a vehicle controls notification using a notification unit included in a steering input unit of the vehicle operates in an operation state selected from a plurality of states. The plurality of states include a first state and a second state that each provide drive assist. Map information including information that is not used in the first state is used in the second state. The second state is based on a condition that a driver of the vehicle grips the steering input unit. The notification control unit does not perform notification using the notification unit while the travel control unit is operating in the first state, and performs notification using the notification unit while the travel control unit is operating in the second state.

11 Claims, 6 Drawing Sheets

(52) U.S. Cl.
CPC .. *B60K 2360/166* (2024.01); *B60K 2360/168* (2024.01); *B60K 2360/188* (2024.01); *B60K 2360/782* (2024.01); *B60W 2050/146* (2013.01); *B60W 2556/40* (2020.02); *B60W 2556/45* (2020.02)

(58) Field of Classification Search
CPC ......... B60W 30/18145; B60W 30/182; B60W 50/082; B60K 35/28; B60K 2360/119; B60K 2360/166; B60K 2360/168; B60K 2360/188; B60K 2360/782
See application file for complete search history.

(56) References Cited

U.S. PATENT DOCUMENTS

| | | | |
|---|---|---|---|
| 10,266,109 | B2 | 4/2019 | Fujii |
| 10,928,818 | B2 | 2/2021 | Ichikawa et al. |
| 11,260,865 | B2 | 3/2022 | Ishioka et al. |
| 11,358,607 | B2 * | 6/2022 | Mimura ................. B60Q 3/283 |
| 11,592,816 | B2 | 2/2023 | Ichikawa et al. |
| 11,794,579 | B2 | 10/2023 | Breisinger et al. |
| 2013/0110343 | A1 | 5/2013 | Ichikawa et al. |
| 2016/0170410 | A1 | 6/2016 | Ichikawa et al. |
| 2018/0143629 | A1 | 5/2018 | Ichikawa et al. |
| 2018/0178714 | A1 | 6/2018 | Fujii |
| 2019/0283777 | A1 | 9/2019 | Mimura et al. |
| 2020/0023830 | A1 * | 1/2020 | Breisinger ........ B60W 60/0051 |
| 2020/0269844 | A1 | 8/2020 | Ishioka et al. |
| 2021/0240181 | A1 | 8/2021 | Ichikawa et al. |
| 2024/0067202 | A1 | 2/2024 | Langlois et al. |

FOREIGN PATENT DOCUMENTS

| | | |
|---|---|---|
| JP | 2020-138578 A | 9/2020 |
| WO | 2018/078740 A1 | 5/2018 |
| WO | 2022/128528 A1 | 6/2022 |

\* cited by examiner

FIG. 2

|            | MANUAL DRIVE MODE (MODE 1) | REGULAR ASSIST MODE (MODE 2) | EXTENDED ASSIST MODE (MODE 3) |
|------------|----------------------------|------------------------------|-------------------------------|
| ACC        | ✕                          | ◯                            | ◯ (with map)                  |
| ACC + LKAS | ✕                          | ◯                            | ◯ (with map)                  |
| ALC        | ✕                          | ✕                            | ◯                             |
| ALCA       | ✕                          | ✕                            | ◯                             |

FIG. 6

| | MODE 2 | MODE 3a | MODE 3b | DOES NOT SATISFY CONTINUATION CONDITION |
|---|---|---|---|---|
| ICON | LIGHT UP IN GREEN | LIGHT UP IN GREEN | LIGHT UP IN BLUE | LIGHT UP IN BLUE |
| SURROUNDING | DISPLAY CONTROL TARGET IN GREEN | DISPLAY CONTROL TARGET AND SCHEDULED TRAJECTORY IN GREEN | DISPLAY CONTROL TARGET AND SCHEDULED TRAJECTORY IN BLUE | DISPLAY CONTROL TARGET AND SCHEDULED TRAJECTORY IN BLUE |
| STEERING WHEEL INDICATOR | OFF | LIGHT UP IN GREEN | LIGHT UP IN BLUE | BLINK IN AMBER |

FIG. 7

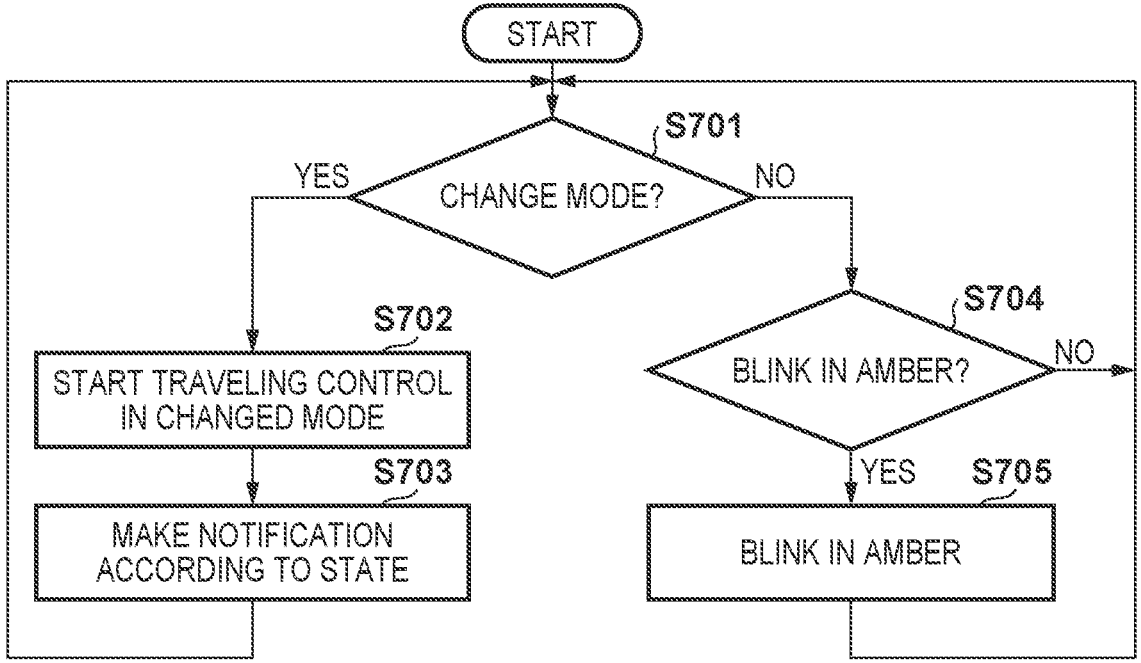

VEHICLE, CONTROL DEVICE AND CONTROL METHOD THEREFOR, AND STORAGE MEDIUM

CROSS-REFERENCE TO RELATED APPLICATION(S)

This application claims priority to and the benefit of Japanese Patent Application No. 2023-051953, filed Mar. 28, 2023, the entire disclosure of which is incorporated herein by reference.

BACKGROUND OF THE INVENTION

Field of the Invention

The present invention relates to a vehicle, a control device and a control method therefor, and a storage medium.

Description of the Related Art

Acceleration/deceleration assist control, lane keeping assist control, or lane change assist control are known as vehicle drive assist technologies (Japanese Patent No. 5382218, Japanese Patent Laid-Open No. 2018-103767, and Japanese Patent Laid-Open No. 2020-138578). Such controls are executed based on map information and a detection result of a sensor that detects a situation around a vehicle. As map information, in addition to relatively low-precision map information used for guiding a route of a vehicle, high-precision map information including position information in a lane is also being utilized. The vehicle may provide drive assist in various states. When a driver can know what a provision state of the drive assist by the vehicle is, the driver can easily use the drive assist with a sense of security.

SUMMARY OF THE INVENTION

According to an aspect of the invention, notification that enables a driver to intuitively know what a state of drive assist is performed.

According to some embodiments, a control device for a vehicle, the control device comprising: a notification control unit configured to control notification using a notification unit included in a steering input unit of the vehicle; and a travel control unit configured to operate in an operation state selected from a plurality of states, wherein the plurality of states include a first state and a second state that each provide drive assist, map information including information that is not used in the first state is used in the second state, the second state is based on a condition that a driver of the vehicle grips the steering input unit, and the notification control unit does not perform notification using the notification unit while the travel control unit is operating in the first state, and performs notification using the notification unit while the travel control unit is operating in the second state is provided.

BRIEF DESCRIPTION OF THE DRAWINGS

FIG. 2 is a diagram illustrating operation modes of a control device according to some embodiments;

FIG. 6 is a diagram illustrating an example of a notification mode according to some embodiments; and FIG. 7 is a diagram illustrating an example of a control method for a vehicle according to some embodiments.

DESCRIPTION OF THE EMBODIMENTS

Figure 1:
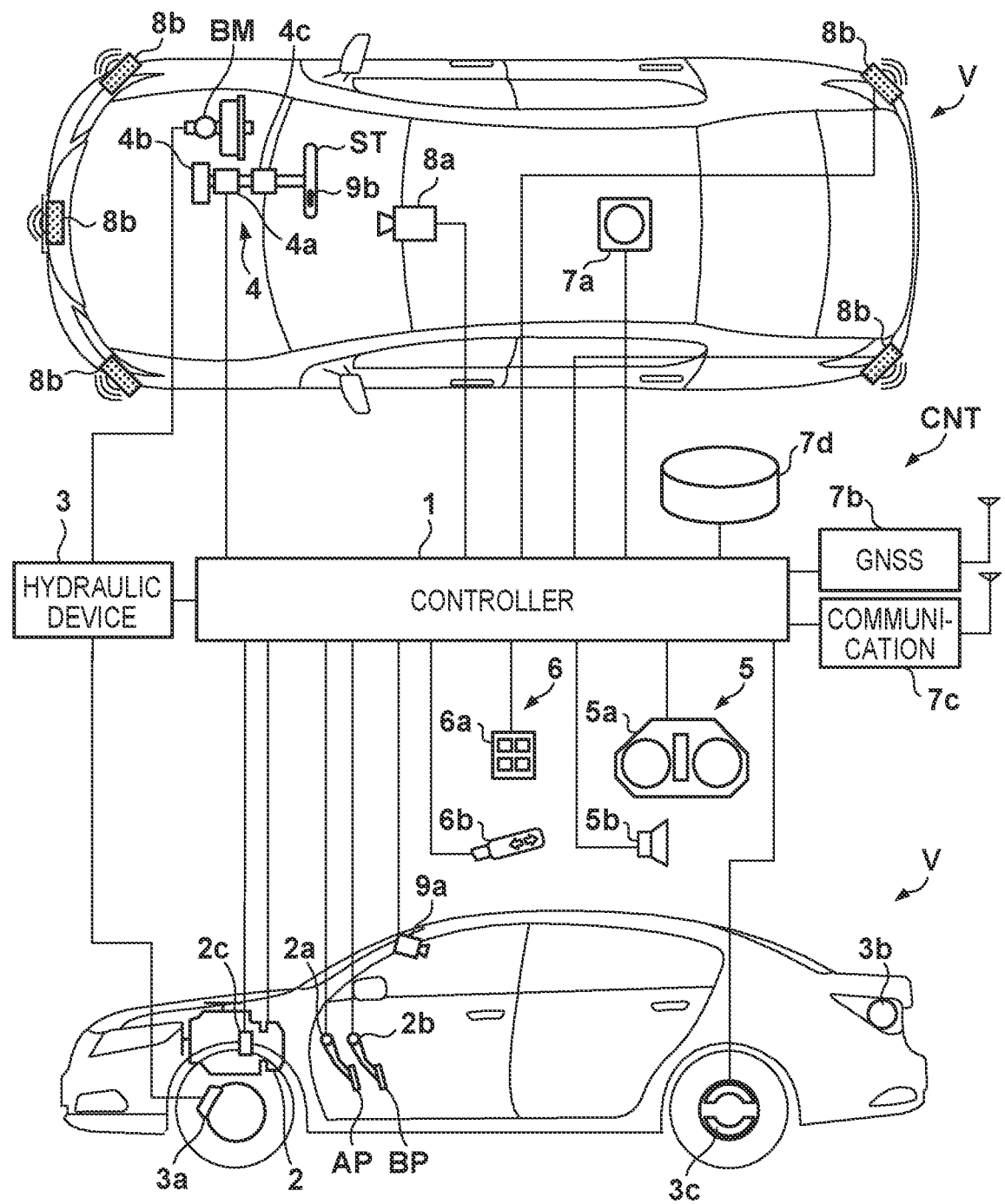
FIG. 1 is a schematic diagram illustrating a configuration example of a vehicle according to some embodiments.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Control Device and Application Example Thereof

FIG. 1 is a block diagram of a control device CNT according to an embodiment of the invention and also a schematic diagram of a vehicle V which is an application example of the control device CNT. In FIG. 1, an outline of the vehicle V is illustrated by a plan view and a side view. The vehicle V in the present embodiment is, as an example, a sedan-type four-wheeled passenger vehicle, and may be, for example, a parallel hybrid vehicle. The vehicle V is not limited to the four-wheeled passenger vehicle, and may be a straddle type vehicle (a motorcycle, an automatic three-wheeled vehicle) or a large vehicle such as a truck or a bus.

The control device CNT includes a controller 1 that is an electronic circuit that executes control of the vehicle V which includes drive assist of the vehicle V. The controller 1 includes a plurality of electronic control units (ECUs). For example, each of the ECUs is provided for each function of the control device CNT. Each ECU includes a processor represented by a central processing unit (CPU), a storage device such as a semiconductor memory, an interface with an external device, and the like. The storage device stores a program to be executed by the processor, data used for processing by the processor, and the like. The interface includes an input and output interface, and a communication interface. Each ECU may include a plurality of processors, a plurality of storage devices, and a plurality of interfaces. A program to be stored in the storage device may be installed in the control device CNT via a storage medium such as a CD-ROM to be stored in the storage device. Additionally or alternatively, the program to be stored in the storage device may be downloaded from an external server via wireless communication.

The controller 1 controls drive (acceleration) of the vehicle V by controlling a power unit (power plant) 2. The power unit 2 is a travelling drive unit that outputs a driving force for rotating driving wheels of the vehicle V, and can include an internal combustion engine, a motor, and an automatic transmission. The motor can be used as a drive source for accelerating the vehicle V, and can also be used as a generator at the time of deceleration or the like (regenerative braking).

In this embodiment, the controller 1 controls outputs of the internal combustion engine and the motor, or switches a gear ratio of the automatic transmission in correspondence with driver's drive operation detected by an operation detection sensor 2a provided in an accelerator pedal AP and an operation detection sensor 2b provided in a brake pedal BP, a vehicle speed of the vehicle V which is detected by a rotation speed sensor 2c, and the like. The automatic transmission is provided with the rotation speed sensor 2c that detects the rotation speed of an output shaft of the automatic transmission as a sensor that detects a traveling state of the vehicle V. It is possible to calculate the vehicle speed of the vehicle V from a detection result of the rotation speed sensor 2c.

The controller 1 controls braking (deceleration) of the vehicle V by controlling a hydraulic device 3. The driver's braking operation on the brake pedal BP is converted into hydraulic pressure in a brake master cylinder BM and is transmitted to the hydraulic device 3. The hydraulic device 3 is an actuator capable of controlling a hydraulic pressure of a hydraulic oil supplied to a brake device 3a (for example, a disc brake device) provided on each of the four wheels based on the hydraulic pressure transmitted from the brake master cylinder BM.

The controller 1 can control braking of the vehicle V by performing drive control of an electromagnetic valve or the like included in the hydraulic device 3. The controller 1 can also configure an electric servo brake system by controlling distribution of a braking force by the brake device 3a and a braking force by the regenerative braking of the motor included in the power unit 2. The controller 1 may turn on a brake lamp 3b at the time of braking.

The controller 1 controls steering of the vehicle V by controlling an electric power steering device 4. The electric power steering device 4 includes a mechanism for steering front wheels in response to a driver's drive operation (steering operation) on a steering wheel ST. The electric power steering device 4 includes a drive unit 4a that exerts a driving force (may be noted as steering assist torque) for assist in the steering operation or automatic steering of the front wheels of the vehicle V). The drive unit 4a includes a motor as a drive source. In addition, the electric power steering device 4 further includes a steering angle sensor 4b that detects a steering angle, and a torque sensor 4c that detects steering torque (also, referred to as steering load torque, and is distinguished from steering assist torque) borne by a driver.

The controller 1 controls electric parking brake devices 3c provided in respective rear wheels of the vehicle V. The electric parking brake device 3c includes a mechanism for locking the rear wheels. The controller 1 is capable of controlling locking and unlocking of the rear wheels by the electric parking brake device 3c.

The controller 1 controls an information output device 5 that notifies the inside of the vehicle of information. The information output device 5 includes, for example, a display device 5a that notifies the driver of information by an image and/or a voice output device 5b that notifies the driver of information by sound. Examples of the display device 5a include a display device provided in an instrument panel, and a display device provided in the steering wheel ST. In this case, the display device 5a may include a head-up display. The information output device 5 may notify an occupant of information by vibration or light.

The controller 1 receives an instruction input from the occupant (for example, the driver) via an input device 6. The input device 6 is disposed at a position operable by the driver, and includes, for example, a switch group 6a that is used when the driver gives an instruction for the vehicle V, and/or a blinker lever 6b for operating a direction indicator (blinker).

The controller 1 recognizes and determines a current position and a course (an attitude) of the vehicle V. In the case of this embodiment, the vehicle V is provided with a gyro sensor 7a, a global navigation satellite system (GNSS) sensor 7b, and a communication device 7c. The gyro sensor 7a detects rotational motion (yaw rate) of the vehicle V. The GNSS sensor 7b detects a current position of the vehicle V. In addition, the communication device 7c performs wireless communication with a server that provides map information and traffic information, and acquires these pieces of information. In this embodiment, the controller 1 determines that the vehicle V is travelling along which route based on the detection results of the gyro sensor 7a and the GNSS sensor 7b, and the controller 1 continuously acquires the map information regarding the determined route from the server via the communication device 7c and then stores the acquired map information in the database 7d (storage device). The vehicle V may also include another sensor that detects a state of the vehicle V such as an acceleration sensor that detects acceleration of the vehicle V.

The controller 1 performs drive assist of the vehicle V based on detection results of various detection units provided in the vehicle V. The vehicle V includes a plurality of surroundings detection units 8a and 8b serving as an external sensor that detects the outside (surrounding situation) of the vehicle V, and a plurality of vehicle interior detection units 9a and 9b serving as an in-vehicle sensor that detects a state inside the vehicle (the state of occupants, particularly, the driver). The controller 1 can ascertain the situation surrounding the vehicle V based on the detection results of the surroundings detection units 8a and 8b and then perform drive assist for the vehicle Vin correspondence with this surrounding situation. In addition, the controller 1 can determine whether or not the driver is performing a predetermined operation obligation imposed on the driver when performing drive assist based on the detection results of the vehicle interior detection units 9a to 9b.

The surroundings detection unit 8a (hereinafter, may be referred to as a front camera 8a) is an imaging device that captures an image in front of vehicle V, and is attached, for example, to a vehicle interior of a windshield at the front of a roof of the vehicle V. The controller 1 can extract a contour of an object or lane marks (such as a white line) on a road by analyzing an image captured by front camera 8a.

The surroundings detection unit 8b is a millimeter wave radar (hereinafter, may be referred to as a radar 8b), detects an object around the vehicle V by using radio waves, and detects (measures) a distance to the object and a direction (azimuth) of the object with respect to the vehicle V. In the example illustrated in FIG. 1, five radars 8b including one at the center of the front part of the vehicle V, one at each of the right and left corner portions of the front part of the vehicle V, and one at each of the right and left corner portions of the rear part of the vehicle V.

The surroundings detection unit provided in the vehicle Vis not limited to the above-described configuration, and the number of cameras and the number of radars may be changed, or a light detection and ranging (LiDAR) for detecting objects around the vehicle V may be provided.

The vehicle interior detection unit 9a is an imaging device that captures an image of the inside of the vehicle (hereinafter, may be referred to as an in-vehicle camera 9a), and is attached to, for example, the vehicle interior at the front part of the roof of the vehicle V. In the case of this embodiment, the in-vehicle camera 9a is a driver monitor camera that captures an image of the driver (for example, eyes and a face of the driver). The controller 1 can determine the directions of the line of sight and the face of the driver by analyzing an image (a face image of the driver) captured by the in-vehicle camera 9a.

The vehicle interior detection unit 9b is a grip sensor (hereinafter, may be referred to as a grip sensor 9b) that detects that the driver grips the steering wheel ST, and is provided, for example, in at least a part of the steering wheel ST. As the vehicle interior detection unit, the torque sensor 4c that detects the steering torque of the driver may be used.

Example of Drive Assist Control

Examples of the drive assist for the vehicle V with respect to the driver include acceleration/deceleration assist, lane keeping assist, and lane change assist. The acceleration/deceleration assist corresponds to drive assist (adaptive cruise control (ACC)) under which the controller 1 automatically controls acceleration/deceleration of the vehicle V within a predetermined speed range by automatically controlling both the power unit 2 and the hydraulic device 3 based on the map information and detection results of the surroundings detection units 8a and 8b. When another vehicle (preceding vehicle) is travelling in front of the vehicle V, ACC can also be executed to accelerate/decelerate the vehicle V so that the distance between the vehicle V and the preceding vehicle is kept constant. ACC is effective to reduce the burden on the driver in an acceleration/deceleration operation (operation on the accelerator pedal AP or the brake pedal BP).

The lane keeping assist corresponds to drive assist (lane keeping assist system (LKAS)) in which the controller 1 automatically controls the electric power steering device 4 based on the map information and the detection results of the surroundings detection units 8a and 8b to keep the vehicle V within the lane. LKAS is effective to reduce the burden on the driver in a steering operation (operation on the steering wheel ST) while the vehicle V is travelling straight.

The lane change assist corresponds to drive assist (auto lane changing (ALC) or active lane change assist (ALCA)) in which the controller 1 automatically changes the lane on which the vehicle V is travelling to an adjacent lane by automatically controlling the power unit 2, the hydraulic device 3, and the electric power steering device 4 based on the map information and the detection results of the surroundings detection units 8a and 8b. ALC corresponds to the lane change assist based on a system request, whereas ALCA corresponds to the lane change assist based on an occupant request. Examples of a situation where the system request is made include a situation where a navigation system recommends the driver to change lanes during route guidance of the vehicle V to a destination, and another situation where the vehicle V attempts to overtake a preceding vehicle independently of the route guidance. When making an occupant request, the driver gives an instruction for lane change by operating an input device (for example, the blinker lever 6b). Both ALC and ACLA are effective to reduce the burden on the driver in the acceleration/deceleration operation or the steering operation on the vehicle V during the lane change.

Other examples of the drive assist control may include, for example, collision reduction braking that assists collision avoidance with an object (for example, a pedestrian, another vehicle, or an obstacle) on a road by controlling the hydraulic device 3, an ABS function, traction control, and/or posture control of the vehicle V.

Drive Assist Mode

In the case of this embodiment, one mode is selectively set among a plurality of modes having different drive assist contents. FIG. 2 is an explanatory diagram thereof. Here, the relationship between the three types of Mode 1 to Mode 3 and the executability of ACC, LKAS, ALC, and ACLA is illustrated. The mode may be referred to as a state. The driver assist content in each of Mode 1 to Mode 3 is not limited to ACC, LKAS, ALC, or ACLA, and may include other driver assist contents. Furthermore, only one of ALC and ACLA may be possible.

Mode 1 corresponds to a manual drive mode in which none of ACC, LKAS, ALC, and ACLA is executed and is based on driver's manual drive operation. This mode is set first when the vehicle V is activated.

Both Mode 2 and Mode 3 are set under the condition that the occupant makes a request for drive assist when the vehicle V is in Mode 1. Mode 2 is a regular assist mode in which both ACC and LKAS are executable. In Mode 2, neither ALC nor ACLA is executed.

Mode 3 is an extended assist mode in which all of ACC, LKAS, ALC, and ACLA are executable. Mode 3 is a mode on the assumption that the controller 1 acquires high-precision map information including information on a road (traveling road) on which the vehicle V travels. The high-precision map information is map information having more precise information about road information than map information (sometimes referred to as normal map information) used for guiding a route to a destination. That is, the high-precision map information includes information that is not included in the normal map information. Specifically, the high-precision map information may include at least position information in a lane. With the high-precision map information, the controller 1 can control a location of the vehicle V in a vehicle width direction. The high-precision map information may further include information regarding a detailed shape of the road such as presence or absence of a curve and a curvature thereof, an increase or a decrease of a lane, and a gradient. The high-precision map information is prepared, for example, for each region or road section, and there may be a region or a road section in which the high-precision map information is not arranged.

In Mode 3, lane change assist (ALC and ACLA) is performed using the high-precision map information. That is, high-precision map information including information not used in Mode 2 is used in Mode 3. By utilizing position information in the lane which is included in the high-precision map information and the current position of the vehicle V detected by the GNSS sensor 7b, it is possible to perform highly reliable and smooth lane change assist while recognizing other surrounding vehicles from the surroundings detection results of the detection units 8a to 8b. The lane change assist may be performed without using the high-precision map information.

Both Mode 2 and Mode 3 are modes capable of executing ACC and LKAS, but in Mode 3, ACC and LKAS using high-precision map information can be executed. In terms of using the high-precision map information, ACC and LKAS in Mode 3 are represented as ACC with map and LKAS with map, respectively. The controller 1 can perform acceleration/deceleration of the vehicle V and position control in a left and right direction by acquiring the road information of a traveling destination of the vehicle V in advance from the high-precision map information, and can provide the occupant with highly reliable and smooth ACC and LKAS.

In some embodiments, Mode 3 may include Mode 3a in which the driver is obliged to grip the steering wheel ST and Mode 3b in which the driver is not obliged to grip the steering wheel ST. The control device CNT may determine whether the driver grips the predetermined steering wheel ST based on the detection results of the vehicle interior detection units 9a and 9b during the operation in Mode 3a. When it is determined that the driver is not gripping the predetermined steering wheel ST, the control device CNT causes the information output device 5 to issue a notification (warning) for prompting the driver to grip the steering wheel ST.

Example of Transition Between Mode Settings

Figure 3:
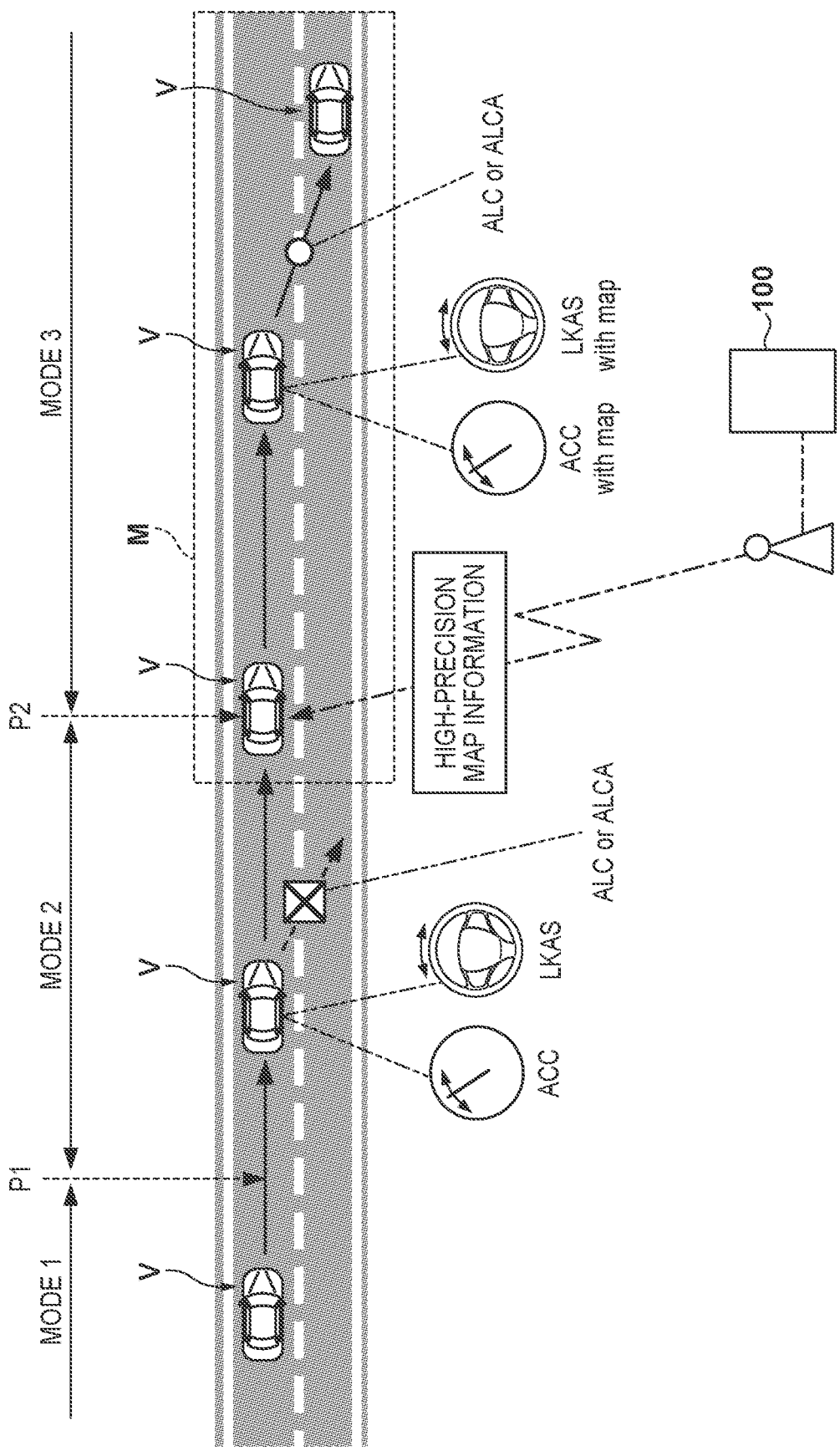
FIG. 3 is a schematic diagram illustrating transition of operation modes according to some embodiments.

FIG. 3 is a diagram illustrating an example of a transition between the drive assist modes. While the vehicle V is traveling in Mode 1, Mode 2 in which the driver gives an instruction for drive assist via the input device 6 at position P1 is set. The controller 1 executes ACC control and LKAS control of the vehicle V. In the drawing, as indicated by a cross mark, the ALC control and the ALCA control of the vehicle V are not performed. When the driver desires a lane change, the lane change is performed by the driver's own drive operation.

The road (traveling path) on which the vehicle V travels is a road on which high-precision map information is provided in the section M. At a location P2, the controller 1 causes the communication device 7c to acquire (receive) the high-precision map information regarding the section M from the map providing server 100 via the communication line. As a result, the drive assist mode is switched from Mode 2 to Mode 3. The controller 1 executes ACC control or LKAS control with the high-precision map information. In addition, the ALC control or the ALCA control is executed according to a system request or an occupant request as indicated by a circle mark in the drawing.

The use of the high-precision map information provided by the map providing server 100 may be performed on condition that the driver of the vehicle V has authority to use the high-precision map information. For example, the driver who wishes to use the high-precision map information may make a request for the map providing server 100 to register the use of the service. In response to this request, the map providing server 100 allocates unique information (ID) to the driver or the vehicle V and stores the information in its own storage device. The control device CNT transmits the unique information allocated to the driver or the vehicle V to the map providing server 100 before starting to use the high-precision map information. This information indicates that the driver or the vehicle V has authority to use the high-precision map information. The map providing server 100 refers to its own storage device, and provides the high-precision map information to the control device CNT in response to confirming that the driver or the vehicle V has the authority to use the high-precision map information.

Example of Indicator of Steering Wheel ST

Figure 4:
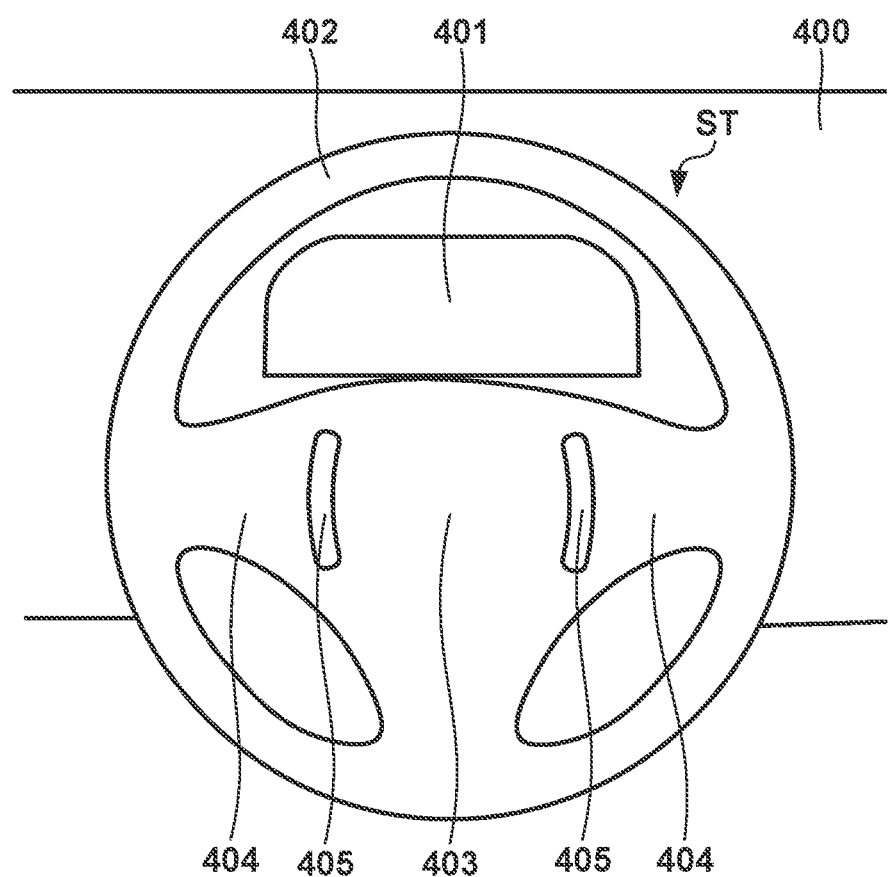
FIG. 4 is a schematic diagram illustrating a configuration example around a steering wheel according to some embodiments.

A configuration example of the steering wheel ST will be described with reference to FIG. 4. The steering wheel ST is attached to an instrument panel 400 disposed at front of the vehicle interior of the vehicle V. The instrument panel 400 includes a meter display section 401. The control device CNT displays various instruments, messages, icons, and the like for notifying the driver of information and a state of the vehicle V on the meter display section 401. In the example of FIG. 4, the meter display section 401 is located behind the steering wheel ST when viewed from the driver.

The steering wheel ST includes a rim 402, a hub 403, and a spoke 404. The rim 402 has, for example, a circular shape. The hub 403 is located on an inner side of the rim 402. The hub 403 is connected to a shaft extending from the instrument panel 400. The hub 403 may store an airbag. The spoke 404 connects the rim 402 and the hub 403 to each other. In the example of FIG. 4, the steering wheel ST includes three pieces of the spokes 404. The three spokes 404 are located on a right side of the hub 403, on a left side of the hub 403, and on a lower side of the hub 403 when viewed from the driver. The steering wheel ST may have a structure other than the structure illustrated in FIG. 4.

The steering wheel ST includes an indicator 405. The indicator 405 is disposed at a position visible from the driver. In the example of FIG. 4, the indicator 405 is included in the spokes 404. Alternatively, the indicator 405 may be included in another portion of the steering wheel ST, for example, in the rim 402 or the hub 403. In the example of FIG. 4, the indicator 405 is constituted by two separate portions, one of the parts is located in the right spoke 404 and the other is located in the left spoke 404. Alternatively, the indicator 405 may be constituted by only one portion or may be constituted by three or more portions. The indicator 405 is an example of a notification unit that performs notification to the driver. Instead of the indicator 405, another notification unit, for example, a dot-matrix type display may be used.

The control device CNT may control notification by using the indicator 405. For example, the control device CNT may operate the indicator 405 in a state selected from a light-off state, a light-on state, and a blinking state. The control device CNT may notify the driver of the operation state of the drive assist by using the indicator 405. For example, the control device CNT may not perform notification using the indicator 405 during operation in Mode 1 (that is, a state in which drive assist is not provided). Specifically, the control device CNT may turn off the indicator 405 during operation in Mode 1.

The control device CNT may not perform notification using the indicator 405 during operation in Mode 2 (That is, a state in which drive assist is provided without using the high-precision map information.). Specifically, the control device CNT may turn off the indicator 405 during operation in Mode 2.

The control device CNT may make a notification using the indicator 405 during operation in Mode 3a (that is, a state in which drive assist using the high-precision map information is provided on condition that the driver of the vehicle V grips the steering wheel ST). Specifically, the control device CNT may turn on the indicator 405 during operation in Mode 3a.

The control device CNT may make a notification using the indicator 405 during operation in Mode 3b (that is, a state in which drive assist using the high-precision map information is provided without requiring that the driver of the vehicle V grips the steering wheel ST). Specifically, the control device CNT may turn on the indicator 405 during operation in Mode 3b.

The control device CNT may perform the notification using the indicator 405 during operation in Mode 3a and the notification using the indicator 405 during operation in Mode 3b in the same manner or in different manners. The difference in the mode of notification may be a difference in an emission color of the indicator 405, a difference in luminance of the indicator 405, or a difference in a size of a light-emitting portion of the indicator 405.

For example, the control device CNT may make a notification using the indicator 405 in a specific color (for example, green) during operation in Mode 3a, and make a notification using the indicator 405 in another color (For example, blue) during operation in Mode 3b. Specifically, the control device CNT may cause the indicator 405 to light up in a specific color (for example, green) during operation in Mode 3a, and cause the indicator 405 to light up in another color (for example, blue) during operation in Mode 3b.

Furthermore, in a case where a specific condition is satisfied, the control device CNT may perform notification using the indicator 405 in a mode different from the above-described mode of notification by the indicator 405 (for example, lighting in blue and lighting in green). An aspect of the notification using the indicator 405 when the specific condition is satisfied may be an aspect in which the indicator 405 is caused to light up in still another color (for example, amber). Hereinafter, the above-described specific condition is referred to as an amber blinking condition.

The amber blinking condition may include that the condition for operating in Mode 3 is no longer satisfied during operation in Mode 3 (Mode 3a or Mode 3b). For example, the control device CNT may determine that the condition for operating in Mode 3 is not satisfied in a case where the high-precision map information is insufficient or a case where the high-precision map information does not match the detection result by the detection unit (for example, the surroundings detection units 8a to 8b) of the vehicle V. In this case, the control device CNT blinks the indicator 405 in an amber state. In a case where the condition for operating in Mode 3b is no longer satisfied during operation in Mode 3b, the control device CNT may change the operation state to Mode 2 in correspondence with a situation in which the driver holds the steering wheel ST. In addition, in a case where the condition for operating in Mode 3a is no longer satisfied during operation in Mode 3a, the control device CNT may change the operation state to Mode 2 after elapse of a certain period of time. In either case, the control device CNT ends the notification using the indicator 405 after changing to Mode 2.

The amber blinking condition may include that the condition for operating in Mode 3a is no longer satisfied during operation in Mode 3a. For example, the control device CNT may determine that the condition for operating in Mode 3a is not satisfied in a case where the driver releases his/her hand from the steering wheel ST. In this case, the control device CNT may blink the indicator 405 in an amber state, and continue Mode 3a in correspondence with a situation in which the driver holds the steering wheel ST.

In the above-described example, the vehicle V includes the steering wheel ST, and the indicator 405 is included in the steering wheel ST. The steering wheel ST is an example of an operation input unit of the vehicle V, and other operation input units may be used. For example, a joystick may be mounted on the vehicle V as an operation input unit. In this case, the indicator 405 may be included in the joystick.

Display Example of Meter Display Section 401

Figure 5A:
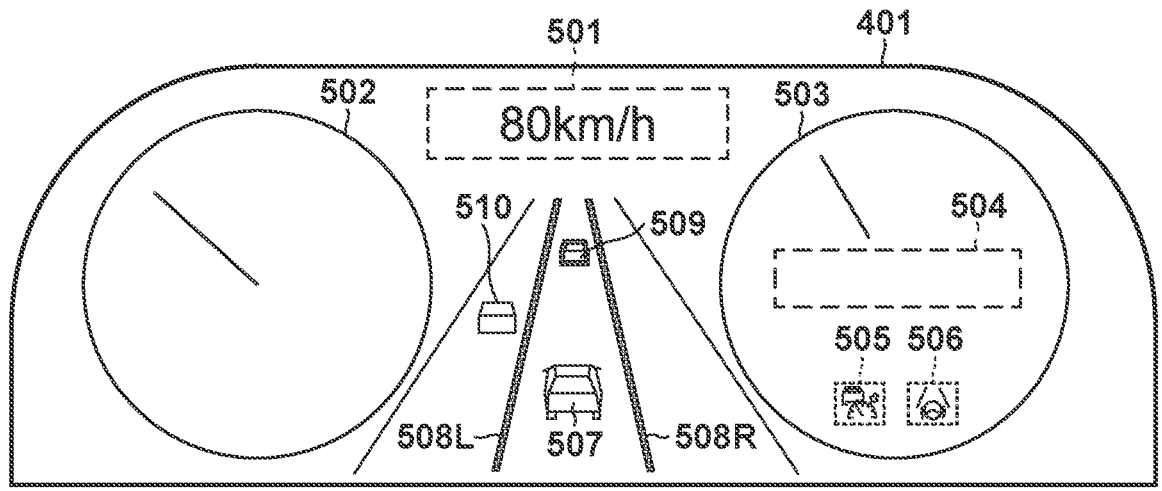
FIG. 5A to FIG. 5C are schematic diagrams illustrating a configuration example of a meter display section according to some embodiments.
Figure 5B:
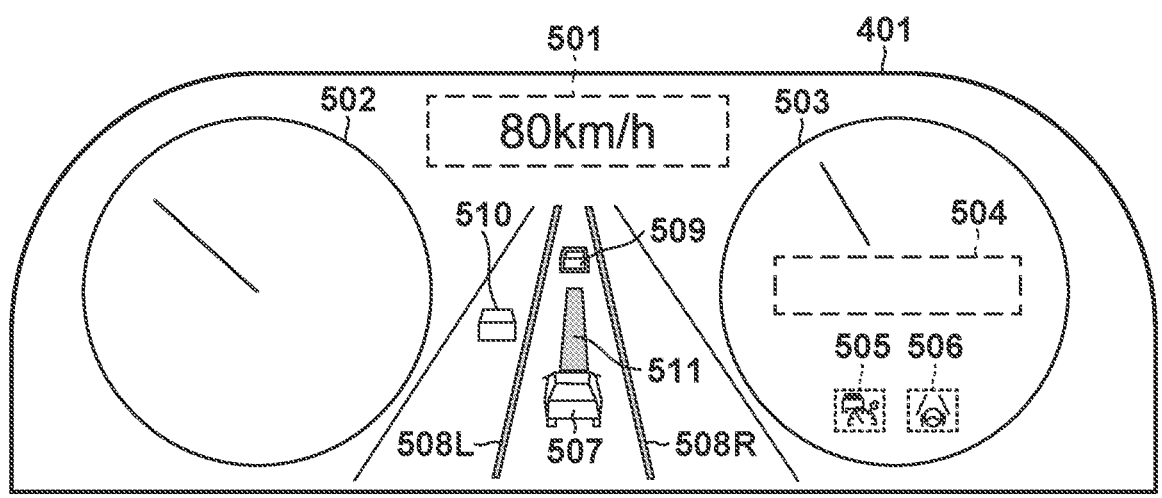
Figure 5C:
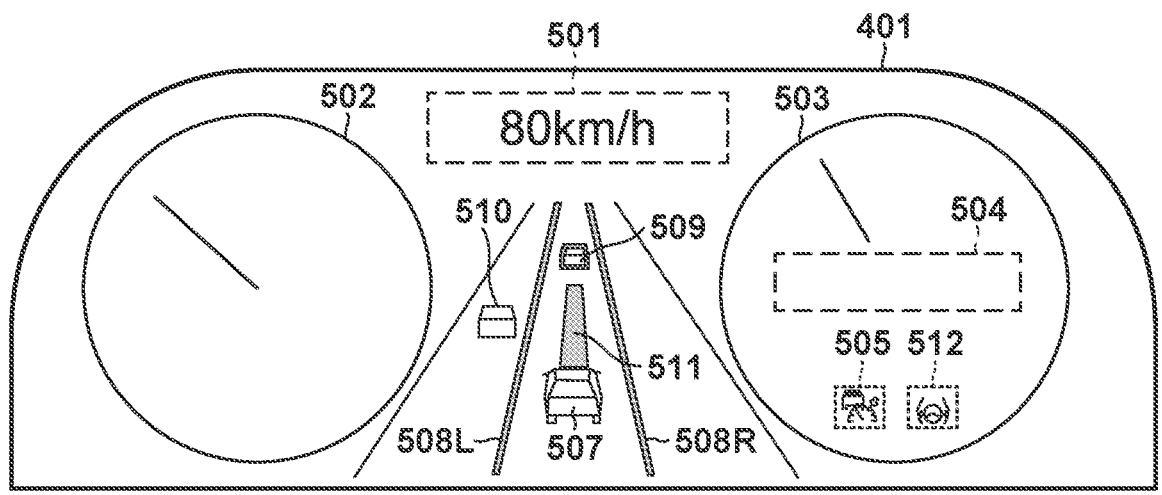

A display example of the meter display section 401 will be described with reference to FIG. 5A to FIG. 5C. The control device CNT may control notification by using the meter display section 401. First, contents that the control device CNT may display regardless of the mode will be described with reference to FIG. 5A. The control device CNT may display a vehicle speed of the vehicle V in a speed region 501 of the meter display section 401. The control device CNT may display tachometer 502 and speedometer 503 on the meter display section 401. The control device CNT may display a message directed to the driver in a message area 504. The control device CNT may display other contents not illustrated in FIG. 5A.

Subsequently, contents that may be displayed on the meter display section 401 while the control device CNT is operating in Mode 2 will be described with reference to FIG. 5A. The control device CNT may display an icon 505 indicating that ACC is being executed while ACC is being executed in Mode 2. The control device CNT may display an icon 506 indicating that LKAS is being executed while LKAS is being executed in Mode 2. In Mode 2, the driver is required to grip the steering wheel ST. The icon 506 also indicates that the driver is obliged to hold the steering wheel ST. Each of the icons 505 and 506 is an example of an icon indicating the content of drive assist.

The control device CNT may display a traffic environment around the vehicle V on the meter display section 401. For example, the control device CNT may display an object 507 indicating the vehicle V (self-vehicle), objects 509 and 510 indicating vehicles traveling in a traveling direction of the vehicle V, and objects 508L and 508R indicating white lines (lane marks) of the road on which the vehicle V is traveling. The objects displayed on the display may also be referred to as graphical objects.

During operation in Mode 2, the control device CNT may display specific contents of the meter display section 401 by using the same color as in the notification using the indicator 405. The content displayed using the same color as in the indicator 405 on the meter display section 401 may include an icon (for example, icons 505 and 506) indicating the content of drive assist. For example, the control device CNT may display the icons 505 and 506 of the meter display section 401 in green when the indicator 405 is lighted in green during operation in Mode 2.

The content displayed by using the same color as in the indicator 405 in the meter display section 401 may include control target information indicated by a traffic environment around the vehicle V. The control target information may be information indicating an object to be controlled in drive assist. For example, when the control device CNT is executing ACC, the object 509 indicating a preceding vehicle is included in the control target information. For example, when the control device CNT is executing LKAS, the objects 508L and 508R indicating white lines located on both sides of the vehicle V are included in the control target information. For example, the control device CNT may display the objects 508L, 508R, and 509 of the meter display section 401 in green when the indicator 405 is lighted in green during operation in Mode 2.

The fact that the emission color of the indicator 405 and the display color of the meter display section 401 are the same represents that when a color space is divided into a plurality of (for example, five) sections, the indicator 405 and the meter display section 401 may be included in the same section. For example, in case where the light emission color of the indicator 405 is light green and the display color of the meter display section 401 is dark green, both may be regarded as the same color. The same shall apply hereinafter with respect to the same color.

Contents that may be displayed on the meter display section 401 while the control device CNT is operating in Mode 3a will be described with reference to FIG. 5B. The contents displayed on the meter display section 401 during operation in Mode 3a may be contents displayed on the meter display section 401 during operation in Mode 2 to which an object 511 indicating trajectory information of the vehicle V is added. The trajectory information of the vehicle V may be information indicating a trajectory on which the vehicle Vis scheduled to travel.

During operation in Mode 3a, the control device CNT may display specific contents of the meter display section 401 by using the same color as in the notification using the indicator 405. The content displayed using the same color as in the indicator 405 on the meter display section 401 may include an icon (for example, icons 505 and 506) indicating the content of drive assist. For example, the control device CNT may display the icons 505 and 506 of the meter display section 401 in blue when the indicator 405 is lighted in blue during operation in Mode 3a.

The content displayed by using the same color as in the indicator 405 in the meter display section 401 may include the control target information and the trajectory information. For example, the control device CNT may display the objects 508L, 508R, 509, and 511 of the meter display section 401 in blue when the indicator 405 is lighted in blue during operation in Mode 3a.

Contents that may be displayed on the meter display section 401 while the control device CNT is operating in Mode 3b will be described with reference to FIG. 5C. The contents displayed on the meter display section 401 during operation in the Mode 3b may be to display the icon 512 instead of the icon 506 displayed on the meter display section 401 during operation in Mode 3a. The icon 512 indicates that LKAS is being executed. In Mode 3b, the driver is not required to grip the steering wheel ST. The icon 512 also indicates that the driver is not obliged to hold the steering wheel ST. The icon 512 is an example of an icon indicating the content of drive assist.

During operation in Mode 3b, the control device CNT may display specific contents of the meter display section 401 by using the same color as in the notification using the indicator 405. The content displayed using the same color as in the indicator 405 on the meter display section 401 may include an icon (for example, icons 505 and 506) indicating the content of drive assist. For example, the control device CNT may display the icons 505 and 506 of the meter display section 401 in blue when the indicator 405 is lighted in blue during operation in Mode 3b.

The content displayed by using the same color as in the indicator 405 in the meter display section 401 may include the control target information and the trajectory information. For example, the control device CNT may display the objects 508L, 508R, 509, and 511 of the meter display section 401 in blue when the indicator 405 is lighted in blue during operation in Mode 3b.

Summary of Notification Mode

A notification mode by the indicator 405 and the meter display section 401 according to some embodiments will be described with reference to FIG. 6. As described above, the control device CNT does not perform the notification using the indicator 405 during operation in Mode 2 (that is, drive assist that does not use high-precision map information.), and performs the notification using the indicator 405 during operation in Mode 3 (that is, drive assist using high-precision map information). As a result, the driver can intuitively know whether the drive assist being executed by the control device CNT is the drive assist using the high-precision map information. In addition, since the notification mode using the indicator 405 is different depending on whether the control device CNT is operating in Mode 3a or Mode 3b, the driver can intuitively know whether or not the obligation to grip the steering wheel ST is imposed. Even when the above-described amber blinking condition is satisfied, the control device CNT may maintain the display color of the icon indicating the content of the drive assist, the control target information, and the trajectory information.

<Control Method of Vehicle V>

An example of a method of controlling the vehicle V will be described with reference to FIG. 7. Steps of the method of FIG. 7 may be performed by executing a program stored in a memory by a processor included in the controller 1 of the control device CNT. Alternatively, a part or all of the steps of the method of FIG. 7 may be performed by a dedicated integrated circuit such as an application-specific integrated circuit (ASIC). The method of FIG. 7 may be initiated in response to activation of the vehicle V.

In S701, the control device CNT determines whether the mode of the vehicle V has been changed. When it is determined that the mode of the vehicle V has been changed ("YES" in S701), the control device CNT shifts the process to S702, and otherwise ("NO" in S701), the control device CNT shifts the process to S704.

In S702, the control device CNT initiates traveling control in the changed mode. When the mode after the change is Mode 2 or Mode 3, the control device CNT initiates drive assist. When the mode after the change is Mode 1, the control device CNT terminates drive assist.

In S702, the control device CNT makes a notification according to the state of the vehicle V in a manner described above and exemplified in FIG. 6. In FIG. 7, for the sake of explanation, S703 is performed after S702, but any of these steps may be performed first. Thereafter, the control device CNT waits for the mode change again in S701.

In S704, the control device CNT determines whether the above-described amber blinking condition is satisfied. When it is determined that the amber blinking condition is satisfied ("YES" in S704), the control device CNT shifts the process to S705, and otherwise ("NO" in S704), the control device CNT shifts the process to S701.

At S705, the control device CNT blinks the indicator 405 in amber. Thereafter, the control device CNT waits for the mode change again in S701. When the mode is changed, S703 is executed, and thus amber blinking in the indicator 405 is terminated.

Summary of Embodiments

<Item 1> A control device (CNT) for a vehicle (V), the control device comprising:
  a notification control unit (CNT) configured to control notification using a notification unit (405) included in a steering input unit (ST) of the vehicle; and
  a travel control unit configured to operate in an operation state selected from a plurality of states,
  wherein the plurality of states include a first state and a second state that each provide drive assist,
  map information including information that is not used in the first state is used in the second state, the second state is based on a condition that a driver of the vehicle grips the steering input unit, and the notification control unit does not perform notification using the notification unit while the travel control unit is operating in the first state, and performs notification using the notification unit while the travel control unit is operating in the second state.

According to this item, it is possible to enable the driver to intuitively know what the state of drive assist is by performing notification using the notification unit included in the operation input unit that is likely to be in a driver's field of view.

<Item 2> The control device according to Item 1, wherein the plurality of states further include a third state in which the drive assist is provided by using the map information without a condition that the driver grips the steering input unit, and the notification control unit performs notification using the notification unit in a first mode while the travel control unit is operating in the second state, and performs notification using the notification unit in a second mode different from the first mode while the travel control unit is operating in the third state.

According to this item, it is possible to intuitively know whether or not it is necessary to grip the steering input unit.

<Item 3> The control device according to Item 2, wherein the notification control unit performs notification using the notification unit in a third mode different from the first mode and the second mode in a case where a condition for the travel control unit to operate in the second state or the third state is no longer satisfied.

According to this item, it is possible to intuitively know that the specific condition is no longer satisfied.

<Item 4> The control device according to Item 2, wherein the notification control unit further controls display using a meter display section (401) of the vehicle, and by the notification control unit, notification using the notification unit and display using the meter display section are performed in a first color while the travel control unit is operating in the second state, and notification using the notification unit and display using the meter display section are performed in a second color different from the first color while the travel control unit is operating in the third state.

According to this item, it is possible to enable the driver to more intuitively know what the state of drive assist is by performing unified notification by both the notification unit and the meter display section.

<Item 5> The control device according to Item 4, wherein the notification control unit displays at least one of trajectory information (511) of the vehicle and control target information (508L, 508R, 509) of the vehicle in the first color while the travel control unit is operating in the second state, and displays at least one of the trajectory information of the vehicle and the control target information of the vehicle in the second color while the travel control unit is operating in the third state.

According to this item, it is possible to enable the driver to more intuitively know what the state of drive assist is by performing unified notification in both the notification unit and the information related to drive assist in the meter display section.

<Item 6> The control device according to Item 4, wherein display using the meter display section includes displaying of an icon (505, 506, 512) indicating a content of the drive assist, and the notification control unit displays the icon in the first color while the travel control unit is operating in the second state, and displays the icon in the second color while the travel control unit is operating in the third state.

According to this item, it is possible to enable to driver to more intuitively know what the state of drive assist by performing unified notification in both the notification unit and the information related to drive assist in the meter display section.

<Item 7> The control device according to Item 1, wherein the notification control unit terminates the notification using the notification unit in a case where the map information is insufficient during operation in the first state or in a case where the map information does not match a detection result by a detection unit (8a, 8b) of the vehicle.

According to this item, it is possible to intuitively know that the map information cannot be used.

<Item 8> The control device according to Item 1, further comprising a transmission unit configured to transmit information indicating that the driver or the vehicle has authority to use the map information to a server (100) that provides the map information.

According to this item, map information can be provided to an authorized driver or vehicle.

<Item 9> A program for causing a computer to function as the control device according to any one of Items 1-8.

According to this item, a program having the advantages described above is provided.

<Item 10> A vehicle comprising the control device according to Item 1.

According to this item, a vehicle having the advantages described above is provided.

<Item 11> A method for controlling a vehicle (V), the method comprising:

controlling (S703) notification using a notification unit (405) included in a steering input unit (ST) of a vehicle; and operating (S702) in an operation state selected from a plurality of states, wherein the plurality of states include a first state and a second state that each provide drive assist, map information including information that is not used in the first state is used in the second state, the second state is based on a condition that a driver of the vehicle grips the steering input unit, and in the notification using the notification unit (405), notification using the notification unit is not performed while the travel control unit is operating in the first state, and notification using the notification unit is performed while the travel control unit is operating in the second state.

According to this item, it is possible to intuitively enable the driver to know what the state of drive assist is by performing notification using the notification unit included in the operation input unit that is likely to be in a driver's field of view.

The invention is not limited to the foregoing embodiments, and various variations/changes are possible within the spirit of the invention.

What is claimed is:

1. A control device for a vehicle, the control device comprising:

a notification control unit configured to control notification using a notification unit included in a steering input unit of the vehicle; and a travel control unit configured to operate in an operation state selected from a plurality of states, wherein the plurality of states include a first state and a second state that each provide drive assist, map information including information that is not used in the first state is used in the second state, the second state is based on a condition that a driver of the vehicle grips the steering input unit, and the notification control unit does not perform notification using the notification unit while the travel control unit is operating in the first state, and performs notification using the notification unit while the travel control unit is operating in the second state.

2. The control device according to claim 1, wherein the plurality of states further include a third state in which the drive assist is provided by using the map information without a condition that the driver grips the steering input unit, and the notification control unit performs notification using the notification unit in a first mode while the travel control unit is operating in the second state, and performs notification using the notification unit in a second mode different from the first mode while the travel control unit is operating in the third state.

3. The control device according to claim 2, wherein the notification control unit performs notification using the notification unit in a third mode different from the first mode and the second mode in a case where a condition for the travel control unit to operate in the second state or the third state is no longer satisfied.

4. The control device according to claim 2, wherein the notification control unit further controls display using a meter display section of the vehicle, and by the notification control unit, notification using the notification unit and display using the meter display section are performed in a first color while the travel control unit is operating in the second state, and notification using the notification unit and display using the meter display section are performed in a second color different from the first color while the travel control unit is operating in the third state.

5. The control device according to claim 4, wherein the notification control unit displays at least one of trajectory information of the vehicle and control target information of the vehicle in the first color while the travel control unit is operating in the second state, and displays at least one of the trajectory information of the vehicle and the control target information of the vehicle in the second color while the travel control unit is operating in the third state.

6. The control device according to claim 4, wherein display using the meter display section includes displaying of an icon indicating a content of the drive assist, and the notification control unit displays the icon in the first color while the travel control unit is operating in the second state, and displays the icon in the second color while the travel control unit is operating in the third state.

7. The control device according to claim 1, wherein the notification control unit terminates the notification using the notification unit in a case where the map information is insufficient during operation in the first state or in a case where the map information does not match a detection result by a detection unit of the vehicle.

8. The control device according to claim 1, further comprising a transmission unit configured to transmit information indicating that the driver or the vehicle has authority to use the map information to a server that provides the map information.

9. A non-transitory storage medium storing a program for causing a computer to function as the control device according to claim 1.

10. A vehicle comprising the control device according to claim 1.

11. A method for controlling a vehicle, the method comprising:

controlling notification using a notification unit included in a steering input unit of a vehicle; and operating in an operation state selected from a plurality of states, wherein the plurality of states include a first state and a second state that each provide drive assist, map information including information that is not used in the first state is used in the second state, the second state is based on a condition that a driver of the vehicle grips the steering input unit, and in the notification using the notification unit, notification using the notification unit is not performed while the travel control unit is operating in the first state, and notification using the notification unit is performed while the travel control unit is operating in the second state.

* * * * *